United States Patent [19]

Fournié et al.

[11] Patent Number: 4,591,191
[45] Date of Patent: May 27, 1986

[54] MECHANICAL COUPLING DEVICE FOR IMMERSED PIPELINES

[75] Inventors: René Fournié, Pau; Francois Besnard, Lescar, both of France

[73] Assignee: Societe Nationale Elf Aquitaine (Production), Courbevoie, France

[21] Appl. No.: 409,635

[22] Filed: Aug. 19, 1982

[30] Foreign Application Priority Data

Sep. 3, 1981 [FR] France .............................. 81 16740

[51] Int. Cl.⁴ .............................................. F16L 23/00
[52] U.S. Cl. ..................................... 285/18; 285/340; 285/363; 29/157 R
[58] Field of Search ......................... 285/18, 340, 363; 29/157 R

[56] References Cited

U.S. PATENT DOCUMENTS

| | | | |
|---|---|---|---|
| 3,353,847 | 11/1967 | Brown | 285/18 |
| 3,554,579 | 1/1971 | Brown | 285/18 |
| 4,062,571 | 12/1977 | Sicard | 285/330 X |
| 4,076,278 | 2/1978 | Chateau et al. | 285/18 |

FOREIGN PATENT DOCUMENTS

| | | | |
|---|---|---|---|
| 632572 | 10/1927 | France . | |
| 1563151 | 3/1969 | France . | |
| 2464426 | 3/1981 | France . | |
| 2476794 | 8/1981 | France . | |
| 2081831 | 2/1982 | United Kingdom | 285/18 |

Primary Examiner—Thomas F. Callaghan
Attorney, Agent, or Firm—Poms, Smith, Lande & Rose

[57] ABSTRACT

A mechanical coupling for immersed pipelines, of which one has a collar at its end.

The device comprises a toothed counter-flange (3) placed against the collar (1a) of the tube to be repaired (1), a tubular body (2) welded by one end to the end of the tube to be assembled with the tube to be repaired (1) provided at its opposite end with an annular abutment (4) and on which tubular body (2) is placed by locking means (5), a mobile assembly comprising a spacer (6) forming the mobile jack body and an internal annular shoulder (6a) of which serves as a piston and defines at least one jack chamber, said spacer (6) cooperating at one of its ends with said locking means (5) and carrying at its other end a toothed flange (7) associated with resilient clamping maintenance means (8), as well as means for moving the locking means (5).

6 Claims, 4 Drawing Figures

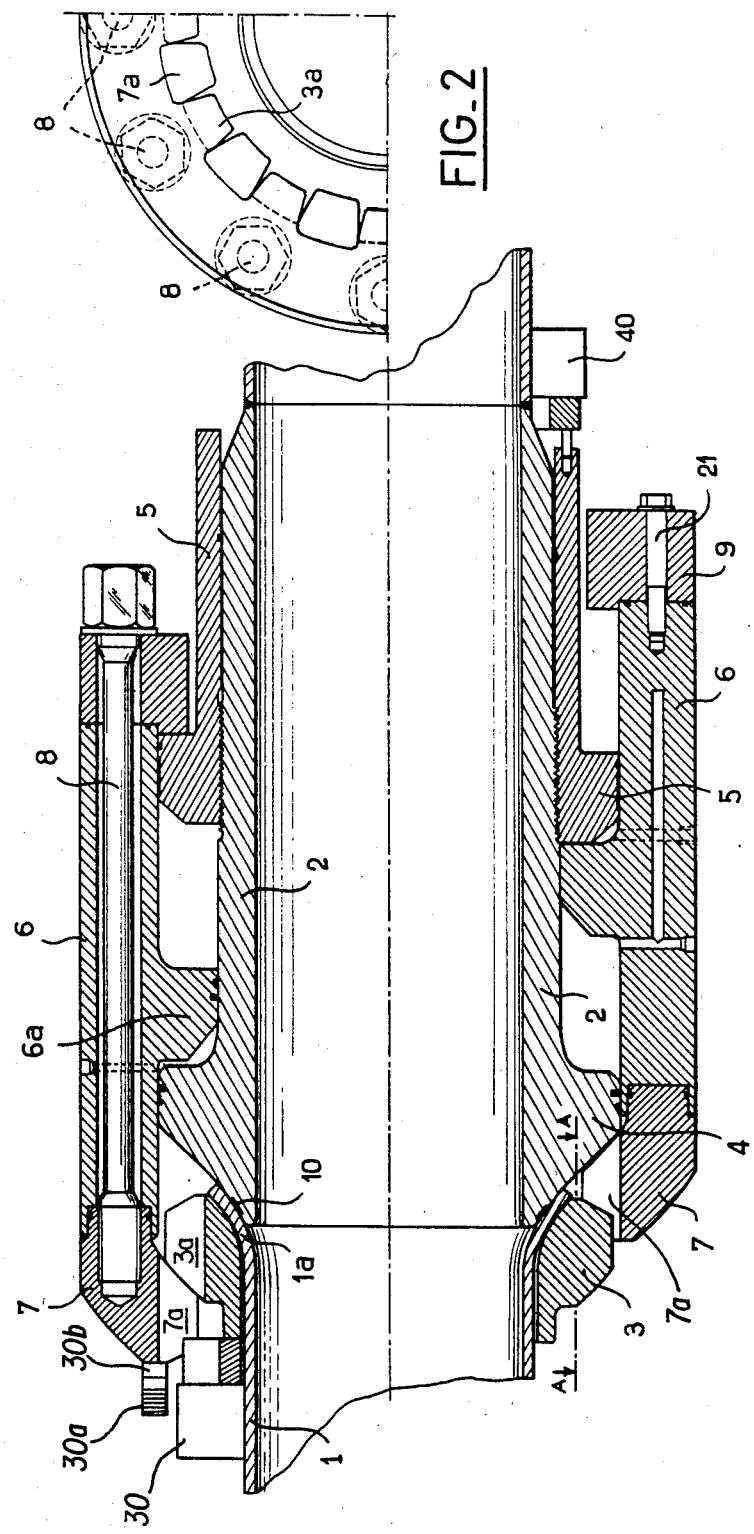

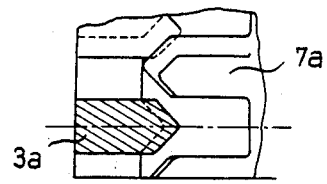
FIG_3
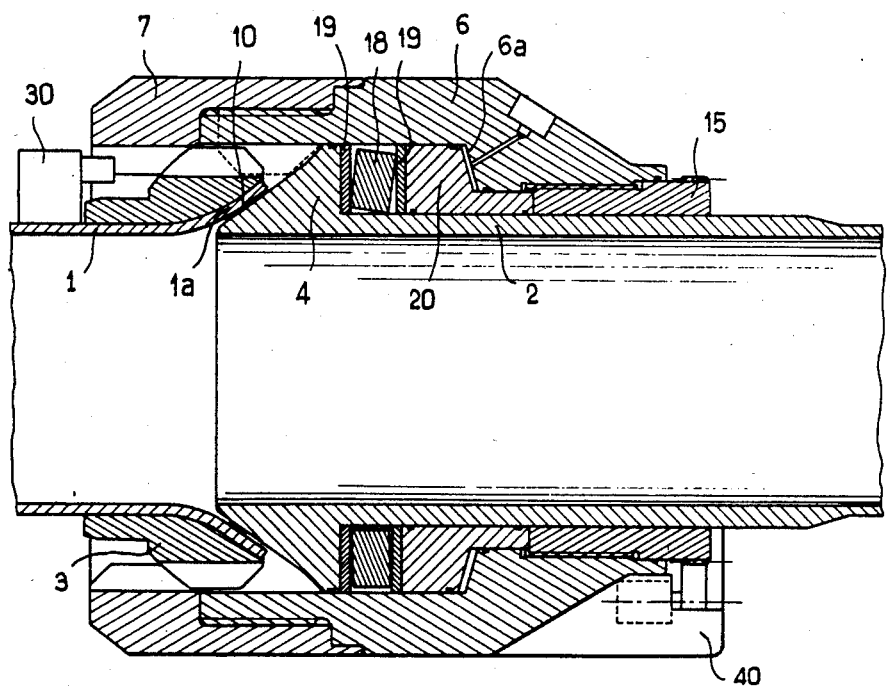
FIG_4

MECHANICAL COUPLING DEVICE FOR IMMERSED PIPELINES

This invention relates to devices for mechanically coupling together pipelines immersed in the sea, which are capable of being remote controlled, as well as processes for using such devices.

During underwater pipeline repairs, it is necessary to connect the tube to be repaired to the replacement tube, by welding or mechanical coupling carried out by divers using special equipment.

In the case of a welded connection, a pressurized welding chamber is required to the extent that the depth is compatible with the metallurgical quality of the weld or with the operational capabilities of the divers. Beyond this depth, the welded connection may be made in underwater chamber at atmospheric pressure, but the operation then depends on the hydrostatic pressure insofar as the operations carried out inside the welding chamber are concerned. The mechanical connection operation may also be made by divers up to a certain depth, and beyond, with the help of special remote controlled equipment.

The present invention relates to this latter category of equipment and more particularly to mechanical coupling by means of connections able to provide and maintain sealing by means of a metal seal between two ends to be joined together, one of which is provided with a collar, in which case the metal seal bears against the cone formed by the collar.

Forming the collar on an immersed pipeline by means of a remote control device forms the subject of U.S. Pat. No. 4,444,527 issued Apr. 24, 1984 in the name of the assignee of this application.

The invention provides a device for mechanically coupling together immersed pipelines, one of which has a collar at one end, capable of being remote controlled, as well as a process for using such a device.

The device of the invention is characterized in that it comprises a counter-flange provided with dogs placed against the collar of the tube to be repaired, a tubular body welded by one end to the end of the tube to be assembled with the tube to be repaired and having at its opposite end an annular abutment, on which tubular body is placed a locking nut or ring, a mobile assembly comprising a spacer forming the mobile body of a cylinder and piston arrangement and an internal annular shoulder which serves as a piston or as mobile wall and defines at least a chamber for said piston and cylinder arrangement, said spacer being cooperable at one of its ends with said locking nut or ring and carrying at its opposite end a flange with dogs associated with resilient clamping means, as well as means for rotating the mobile assembly and means for moving the locking nut or screw.

The purpose of the mobile assembly is to provide interengagement of the dogs of the flange and of the counter-flange and to place the tubular body in stress against the collar of the tube to be repaired, until the metal seal interposed between the collar and the tubular body is crushed. The role of the resilient means associated with the mobile assembly is to maintain the clamping stress exerted on the seal to compensate for deformation thereof due to the crushing because of the working conditions.

According to a first embodiment, the device is characterized in that the shoulder of the spacer serves as a double-acting piston and defines two jack chambers limited respectively by the locking screw and the annular abutment. The resilient clamping holding means comprise tierods passing through the spacer which are screwed into the flange with dogs and whose heads bear on the locking nut screwed onto the tubular body through a bearing piece fixed at the end of the spacer opposite that carrying the counter-flange with dogs.

Thus, the tierods give to the system an elongation capability to compensate for deformation of the seal, this clamping force being maintained by the tie rods tightened with locking on the tubular body. According to another embodiment, the spacer forming the mobile jack body contains a jack chamber one mobile wall of which is adjacent an annular housing containing a conical washer serving as elastic means for maintaining the clamping. The mobile assembly comprises, besides the distance piece and the flange with dogs, a locking ring, whose external threads fit by screwing into a bore provided at the end of the distance piece opposite that carrying the flange. Thus, the clamping force is maintained by the conical washer under compression with locking on the spacer, which is always under tension.

Other features of the invention will appear from the following description of embodiments thereof, illustrated by the enclosed drawings in which:

FIG. 1 shows in axial section the embodiment comprising tierods before locking of the dogs (upper part of figure) and after locking (lower part of the figure);

FIG. 2 is a side view of the flanges provided with dogs;

FIG. 3 is a section along line A—A of FIG. 1; and

FIG. 4 shows in axial section an embodiment comprising a conical washer, before compression thereof (upper part of the figure) and after compression thereof (lower part of the figure).

In the two embodiments, the tube to be repaired designated by 1 has a counter-flange 3 with dogs 3a and its end has been shaped as a collar 1a, against which the counter-flange 3 is applied. The tubular body 2 is welded to a tube to be assembled or an insert tube not shown and it is provided with an annular abutment 4. A metal seal 10 is placed in the bare mouth portion of collar 1a to provide sealing against the end of tubular body 2, whose form corresponds to that of the bare mouth of the collar.

In one of the embodiments of the device of the invention, shown in FIGS. 1 and 2, a locking nut 5 is screwed onto the tubular body 2. A mobile assembly surrounding tubular body 2 comprises a distance piece 6 having an annular shoulder 6a which defines on each side two jack chambers limited on the one hand by the annular abutment 4 and on the other by the locking nut 5 which is screwed onto a portion of the tubular body 2. The function of this inner shoulder 6a is to act as a double-acting piston, which ensures the axial translation of the movement of the mobile assembly. Seals provide sealing between the parts of the mobile assembly on the one hand and the tubular body 2 and the nut 5 on the other.

The spacer 6 has passing there through the tierods 8 disposed in circle, whose ends are screwed into flange 7 with dogs 7a, which they hold against one end of the spacer 6. A bearing piece 9 is fixed by bolts 21 to the opposite end of the spacer and the heads of the tierod rest there against.

At the beginning of the coupling operation, tube 1 and tubular body 2 are centered, the tierods being under small uniform stress, ensuring support for parts 7, 6 and 9.

When the hydraulic pressure is admitted into the lower pressure chamber defined by shoulder 6a and nut 5, the mobile assembly moves in the direction of the collar and takes up position with the bearing piece 9 in abutment against the locking nut 5, as shown in the upper part of FIG. 1. During this movement, because of the profile of the indentation of the toothed flanges, the mobile assembly is rotatably orientated, the dogs or teeth 7a of flange 7 pressing through the indentations present between the dogs 3a of the counter-flange 3.

The flange and the toothed counter-flange are then staggered in position.

To align the dogs axially, the assembly is rotated by $\frac{1}{2}/N$ of a revolution, the number N representing the number of dogs with which the flange is provided. Because of the shape given to the inner surfaces of the dogs, they face each other and are locked in bearing position. The rotation and locking of the assembly to bring the dogs into the desired position may be effected either by separate accessory equipment, brought and recovered at the end of the operation, or by means of a pinion placed at the end of the toothed counter-flange, for example a pinion 30a rotated by drive means 30, the pinion 30a having meshed engagement with a ring type gear means 30b carried on flange 7 of the mobile assembly. The pinion 30a may be activated by means of a previously cocked spring which is self-releasing after $\frac{1}{2}/N$ of a revolution.

When the dogs are in position, the low pressure chamber is decompressed and the pressure admitted to the other side of shoulder 6a, into the high pressure chamber. The spacer 6 moves to clamp the dogs against each other and seal 10 is crushed between tube 1 and body 2. There occurs a slight elongation of the tierods 8 which are under tensional stress. The locking screw 5 is screwed up, for example by means of hydraulic spanner 40, so that the bearing piece 9 bears on the tubular body 2 through the locking nut 5. The high pressure chamber is then decompressed. The extension capacity of tierods 8 supplies the resilient force guaranteeing that uniform clamping stress is maintained on the seal, whatever the deformations which it has undergone.

As a variation (FIG. 4), the resilient clamping maintenance means, are formed by conical washer 18 placed between two rings 19 in an annular housing bearing against the annular abutment 4. On tubular body 2 slides the mobile assembly formed of the spacer 6 integral with the toothed flange 7 and with a locking ring 15, whose external thread is screwed into a bore provided at the end of the spacer opposite that carrying the flange. An annular wedge 20 is placed in contact with one of rings 19 and defines with shoulder 6a of the spacer a jack chamber, whose walls are mobile.

The housing for the conical washer 18 is defined, on the one hand, by the annular abutment 4, and on the other hand, by a wall of wedge 20 transmitting the pressure exerted by the jack so as to deform the washer. In operation, the mobile assembly is caused to advance axially in the direction of the collar by means of a jack, forming part of an accessory equipment not shown, so as to cause the dogs 7a of flange 7 to pass through the indentation present between the dogs 3a of the counter-flange 3, until wedge 20 meets, through washer 18, the resistance opposed by the annular abutment 4. The assembly is then rotated by 1/N of a revolution so that the dogs come into contact. The pressure is admitted into the jack chamber, which results, on the one hand, in causing the spacer integral with the flange to move back and clamping and locking of the dogs to be effected and, on the other hand, a pressure to be exerted in the opposite direction on wedge 20, by means of which the force exerted deforms the conical washer 18. When the washer is deformed and crushed between rings 19, locking ring 15 is caused to advance, by screwing it, until it comes into contact with wedge 20. Maintenance of the clamping is thus ensured, after decompression of the jack chamber, by the conical washer 18 under compression with locking on the spacer provided by ring 15.

In the embodiment shown in FIGS. 1 and 2, it is the tierods alone which are under a tensional stress for maintaining the clamping, whereas, according to the embodiment shown in FIG. 4, it is the spacer 6 and flange 7 which share this stress.

The accessory equipment, serving for advancing the mobile assembly in the direction of the collar, may be recovered after installation and brought up to the surface again.

The coupling device of the invention which may be used not only in the case of construction but also in the case of repair, provides numerous advantages. In the case of pipeline repair, the counter-flange is not always perfectly centered in the axis of the cone of the collar. To compensate for this centering defect, the counter-flange is machined with a spherical bearing surface whose center is brought as close as possible to the intersection point of the perpendiculars to the generatrix of the bell-shaped cone in the zone providing this sealing.

The resilient clamping maintenance means used, according to the invention, in a device where clamping of the seal itself is effected by means of a jack actuating toothed flanges, may take on other forms than those of tierods or conical washers. In fact, any means providing resilient maintenance of clamping of the seal, to compensate for the deformations which it undergoes during pressure and temperature stresses, known to a man skilled in the art, may be used without departing from the scope and spirit of the invention.

What is claimed is:

1. A mechanical coupling device for interconnecting two tubes, comprising in combination:
    a tubular body connected at one end to the end of one tube,
    said tubular body including an outwardly directed shoulder adjacent one end thereof and a seal face;
    locking means carried by said tubular body adjacent to the other end thereof;
    collar means on the end of the other tube and having a seal face and having a set of dogs;
    a mobile assembly carried by said tubular body and having at one end a set of dogs to cooperate with the set of dogs on said collar means;
    said mobile assembly having resilient deformable clamping maintenance means and having an internal inwardly directed shoulder received between said outwardly directed shoulder on said tubular body and said locking means to provide a jack chamber in which the internal shoulder acts as a piston;
    said mobile assembly being movable relative to the collar to pass the sets of dogs between each other and to then align the sets of dogs axially;
    means to pressurize the jack chamber to engage under pressure the aligned sets of dogs to deform the resilient clamping maintenance means and to sealingly engage said seal faces;

said locking means being adapted to lock the tubular body relative to the mobile assembly with said resilient maintenance means under deformation.

2. A device as claimed in claim 1 wherein the resilient clamping maintenance means comprises tie rods carried by the mobile assembly.

3. A device as claimed in claim 1 wherein the resilient clamping maintenance means includes a fixed abutment on the tubular body and a movable portion on which is formed said outwardly directed shoulder, said resilient clamping maintenance means comprising a conical washer mounted between the abutment and the movable portion.

4. A device as claimed in claim 3 wherein the locking means comprises an externally threaded locking ring having threaded engagement with internal threads in a bore of the mobile assembly.

5. A device as claimed in claim 3 wherein said movable portion comprises an annular wedge.

6. A method of coupling two tubes by a device having a collar means with a set of dogs and a tubular body having mobile means having a set of dogs cooperable with the collar set of dogs to compress a seal means between said collar means and said tubular body, a lock means on the tubular body, a jack chamber between the tubular body and mobile means, and deformable resilient maintenance means between the mobile means and the tubular body including the steps of:

axially aligning the two tubes;

moving the sets of dogs relative to each other to pass one set of dogs through the other set of dogs and to then axially align the dogs;

pressurizing the jack chamber to relatively move and position the mobile means and the tubular body to urge the sets of dogs into pressure contact, to compress the seal means, and to deform said deformable resilient maintenance means;

and locking said mobile means and tubular body in such latter position while the resilient deformable maintenance means are under deformation;

and depressurizing said jack chamber.

* * * * *